(12) United States Patent
Gormsen et al.

(10) Patent No.: US 12,432,088 B2
(45) Date of Patent: Sep. 30, 2025

(54) VERIFICATION OF FIELDBUS NETWORK CONNECTED DEVICES IN A WIND TURBINE SUB-ASSEMBLY

(71) Applicant: VESTAS WIND SYSTEMS A/S, Aarhus N (DK)

(72) Inventors: Arne Gormsen, Aarhus N (DK); Jesper Holm, Skødstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 362 days.

(21) Appl. No.: 18/194,546

(22) Filed: Mar. 31, 2023

(65) Prior Publication Data

US 2023/0318874 A1 Oct. 5, 2023

(30) Foreign Application Priority Data

Apr. 1, 2022 (EP) .................................... 22166333

(51) Int. Cl.
*H04L 12/40* (2006.01)
*H04L 67/12* (2022.01)

(52) U.S. Cl.
CPC ........ *H04L 12/40123* (2013.01); *H04L 67/12* (2013.01); *H04L 2012/40215* (2013.01)

(58) Field of Classification Search
CPC . G05B 19/4185; G05B 19/0428; Y02P 90/02; F03D 7/0224; F03D 7/0204;
(Continued)

(56) References Cited

U.S. PATENT DOCUMENTS

2010/0149997 A1* 6/2010 Law .................. G05B 19/4185
370/248
2012/0310384 A1* 12/2012 Smith ..................... H04L 12/66
700/82
(Continued)

FOREIGN PATENT DOCUMENTS

CN 112954727 A 6/2021

OTHER PUBLICATIONS

European Patent Office, Extended European Search Report for Application 23164900.5-1205 dated Aug. 14, 2023.
(Continued)

*Primary Examiner* — Mahran Y Abu Roumi
(74) *Attorney, Agent, or Firm* — Patterson + Sheridan, LLP; Gero G. McClellan

(57) ABSTRACT

The present invention relates to verification of connections between a computing unit, such as a test computer, and a device, e.g. a sensor or transducer, in a fieldbus network of a sub-assembly of a wind turbine. The fieldbus network comprises a plurality of network components. One of the network components comprises a program element. The computing unit is arranged for forwarding a request to the program element to verify the connection from the computing unit to a selected device, the request comprising a sequence of selected network components between the computing unit and the selected device. The program element is arranged to establish in a sequenced manner a communication connection between the selected network components and the selected device, and to provide a response as to whether or not the connection exists.

20 Claims, 2 Drawing Sheets

(58) Field of Classification Search
CPC .... F03D 7/047; F03D 17/00; F05B 2270/328; F05B 2220/706; H04L 41/0806; H04L 41/12; H04L 43/0811; H04L 67/12

See application file for complete search history.

(56) References Cited

U.S. PATENT DOCUMENTS

2019/0010924 A1* 1/2019 Theopold .............. F03D 7/0224
2021/0016438 A1* 1/2021 Pivac ..................... G01S 17/42

OTHER PUBLICATIONS

European Patent Office, Extended European Search Report and Written Opinion for European Patent Application No. 22166333.9-1205, dated Sep. 28, 2022.

* cited by examiner

VERIFICATION OF FIELDBUS NETWORK CONNECTED DEVICES IN A WIND TURBINE SUB-ASSEMBLY

FIELD OF THE INVENTION

The present invention relates to verification of connections between a computing unit, such as a test computer, and a device, e.g. a sensor or transducer, in a fieldbus network. The device being arranged in or connected to a sub-assembly of a wind turbine.

BACKGROUND OF THE INVENTION

A wind turbine is a complex machine comprising a number of sub-assemblies. In addition to such sub-assemblies as the rotor, the tower and the drive train, a wind turbine also includes sub-assemblies in the form of a complex setup of electric, electronic and electro-mechanical devices and component arranged in a communication network. The communication network is often a fieldbus network and may include different types of networks, such as ethernet-based networks connected to CAN networks.

During manufacturing, prior to putting a wind turbine in operation as well as during service or repair of an operating wind turbine, it is important to test that devices of the wind turbine are correctly connected in the fieldbus network. However due to the large number of such devices and the complex nature of the network, test and verification of such connection can be a considerable task.

For example, in connection with production of a sub-assembly, it is normal that such production is handled by a sub-supplier, which then builds the sub-assembly in accordance with the agreed specifications. To test and verify that the control system will be able to connect to given devices of the sub-assembly, a test engineer will need to be able to establish a communication path between a test computer and the given device, through the oftentimes complex network. This may require a number of device drivers, communication protocols and other software elements that needs to be combined and maintained over time as the elements of the sub-assembly may change, e.g. due to changes in hardware constellations, device upgrades, device replacements, etc.

It is against this background that the invention has been devised.

SUMMARY OF THE INVENTION

It would be advantageous to provide a setup which facilitates testing of sub-assemblies of a wind turbine. In particular, it would be advantageous to achieve a way of verifying a communication connection from a computing unit to a device connected to a communication network in a wind turbine sub-assembly in a simple and generic manner.

Accordingly, in a first aspect, there is provided a method for verifying a connection from a computing unit to a device connected to a fieldbus network in a wind turbine sub-assembly, the communication network comprises a plurality of network components, and wherein one of the network components comprises a program element including a list of possible network components and possible devices, and a library of software elements capable of establishing a communication path between the possible network components and possible devices;

the computing unit is arranged for forwarding a request to the program element to verify the connection from the computing unit to a selected device, the request comprising a sequence of selected network components establishing a requested communication path between the computing unit and the selected device;

wherein the program element is arranged to establish in a sequenced manner a communication connection between the selected network components and the selected device by establishing a communication connection between each selected network component and a subsequent selected network component along the requested communication path; and if the communication connection can be established, forward a response to the computing unit that the connection exists, and if the communication connection cannot be established, forward a response to the computing unit identifying the selected network component to which the communication connection cannot be established.

In the present invention it has been realized that by providing a program element that includes a list of possible network components and possible devices of the wind turbine assembly, and a library of software elements capable of establishing a communication path between the possible network components and possible devices, the test engineer does not need to ensure communication access to the actual components and devices of the sub-assembly, as the software element can cover all hardware configurations, as long as the hardware configurations only include hardware on the list of possible network components and possible devices of the wind turbine assembly. Instead only the program element need to be kept updated of all possible components and devices. Dedicated software is therefore not needed for different versions of a sub-assembly, or even for different sub-assemblies. Only when new hardware is added is there a need for updating the program element. A given program element can thereby be used for a variety of wind turbine models and their sub-assemblies.

Furthermore, it has been realized that by including a sequence of selected network components establishing a requested communication path between the computing unit and the selected device into a request to the program element, the program element can be made independent of the specific hardware constellations of a given wind turbine sub-assembly, that is the program element can be made independent of a specific fieldbus layout and all elements in the path from the test PC to the fieldbus device itself. In this manner, any hardware constellation can be tested without detailed knowledge of how devices in the network communicate with each other. Instead the program element is arranged to establish in a sequenced manner a communication connection between the selected network components and the device based on responses obtained from the intermediate components in the communication path. In this manner, the test engineer only needs documentation of how the device under test (DUT) is arranged in order to include this in the request. If the communication connection can be established for all network components between two subsequent selected network components along the requested communication path, a response to the computing unit can be forwarded that the connection exists, i.e. a successful test is made. If the communication connection cannot be established, a response to the computing unit can be forwarded identifying the selected network component to which the communication connection cannot be established. In this manner the root cause of the unsuccessful test is provided.

Verification of a communication connection from a computing unit to a device connected in a fieldbus network in a wind turbine sub-assembly is thereby greatly facilitated.

In embodiments, the network components comprise computing units, ethernet switches and CAN networks. That is the network components comprise components which are equipped with functionality of data communication.

The device may be a network component or includes a network component. This may be the case if such a device is to be tested. Generally, however, the device is a transducer or a sensor. The terms transducer and sensor may be overlapping. A sensor may be understood as a transducer that is capable of determining a measurement value. The device may also be such elements as circuit breakers and variable frequency drives VFDs.

In an embodiment, the method is performed prior to placing the sub-assembly in a wind turbine. This may be the case where the testing is done at the factory or at a dedicated test facility in connection with installing a new turbine or a new sub-assembly in a turbine.

In another embodiment, the method is performed on the sub-assembly arranged in a wind turbine. This may be the case for a final test before starting up a new turbine or it may be in connection with service or repair of an existing sub-assembly.

In a further aspect there is provided a computer program product comprising software code adapted to verify a connection from a computing unit to a device connected to a fieldbus network in a wind turbine sub-assembly, the fieldbus network comprises a plurality of network components, and wherein the computer program product comprises a program element arranged at one of the network components, the computer program including a list of possible network components and possible devices, and a library of software elements capable of establishing a communication path between the possible network components and possible devices; and wherein the computer program product is adapted to:

forwarding a request received from the computing unit to the program element to verify the connection from the computing unit to a selected device, the request comprising a sequence of selected network components establishing a requested communication path between the computing unit and the selected device;

wherein the program element is arranged to establish in a sequenced manner a communication connection between the selected network components and the selected device by establishing a communication connection between each selected network component and a subsequent selected network component along the requested communication path; and if the communication connection can be established, forward a response to the computing unit that the connection exists, and if the communication connection cannot be established, forward a response to the computing unit identifying the selected network component to which the communication connection cannot be established.

The computer program product may be a software system implementation of the method of the first aspect of the invention.

The computer program product may be provided on a computer readable storage medium or being downloadable from a communication network. The computer program product comprises instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions can be executed by a processor.

BRIEF DESCRIPTION OF THE DRAWINGS

Embodiments of the invention will be described, by way of example only, with reference to the drawings, in which.

DESCRIPTION OF EMBODIMENTS

Figure 1:
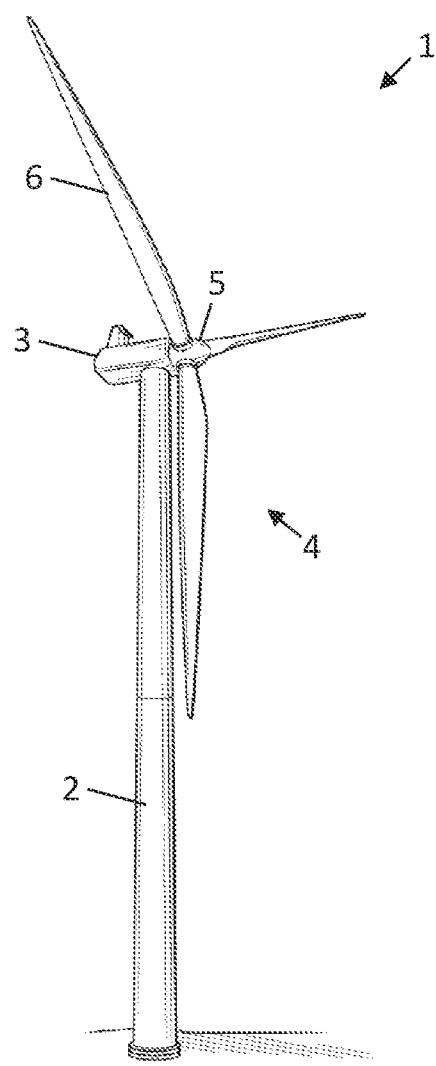
FIG. 1 illustrates, in a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary.

Moreover, the wind turbine comprises a control system. The control system may be placed inside the nacelle or distributed at a number of locations inside (or externally to) the turbine and communicatively connected. The control system is here used in a broad sense to include computing units, communication system units, transducers, sensors, etc. In addition to control signals, the communication system may also serve for other purposes, hereunder data handling for various purposes.

Figure 2:
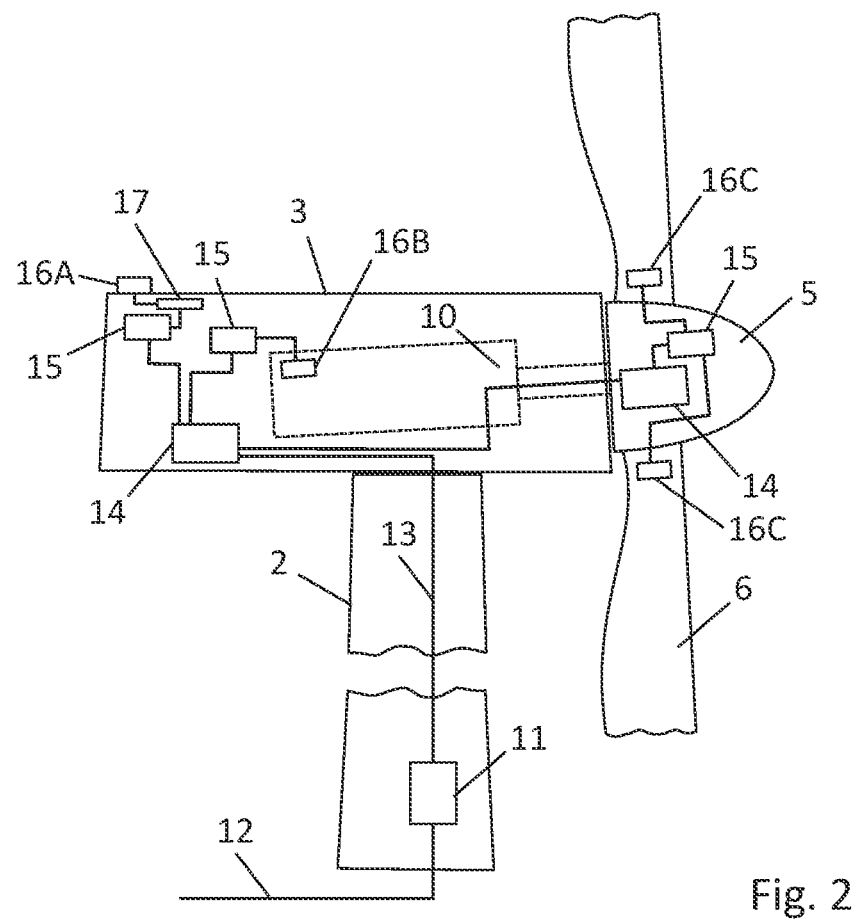
FIG. 2 schematically illustrates elements of a fieldbus network together with elements of a wind turbine.

FIG. 2 schematically illustrates elements of a control system arranged as a fieldbus network, together with elements of a wind turbine. In addition to the elements shown in FIG. 1, also a schematic representation of a drive train 10 is provided.

The control system comprises a number of elements arranged as a fieldbus network, here illustrated in a simplified schematic manner. The term fieldbus network is to be understood broadly as the collective system of connected elements of the distributed control system of a wind turbine. The fieldbus may include a communication backbone, such as an Ethernet network, to which computing elements, further networks and I/O devices, e.g. sensors, transducers and associated controllers are connected. The system illustrated in FIG. 2 includes a main controller 11 with a processor and a memory, so that the processor is capable of executing computing tasks based on instructions stored in the memory. The control system may be connected to an external network 12, such as park network so that the turbine may be operated based on externally provided instructions, as well as send out data. The external network is illustrated to be connected to the main controller 11 directly, it may however alternatively be connected to the turbine network via a switch. The fieldbus network includes a turbine network 13 interconnecting various components and devices in the turbine.

The fieldbus network may include communication switches 14 connected to distributed controller nodes 15, further connected to I/O devices 16 such as sensors and transducers.

In the illustrated example, a wind sensor 16A is connected to a distributed controller node 15 via a CAN network 17, and thereby connected to the main controller 11. As illustrated, further sensors, such as a drive train sensor 16B, e.g. a vibration sensor, and blade load sensors 16C may be connected directly to a distributed controller node 15.

FIG. 2 illustrates a largely simplified version of a real wind turbine. In reality a WTG is built up of a large number of sub-assemblies build at specialized factories, oftentimes by sub-suppliers.

Many of these WTG sub-assemblies are only accessible through multiple communication interfaces and protocols. In addition, there can be complicated interaction and constellation of equipment that may complicate testing of connections in the produced parts, especially differentiating whether a problem is due to connectivity issues or a malfunction.

Figure 3:
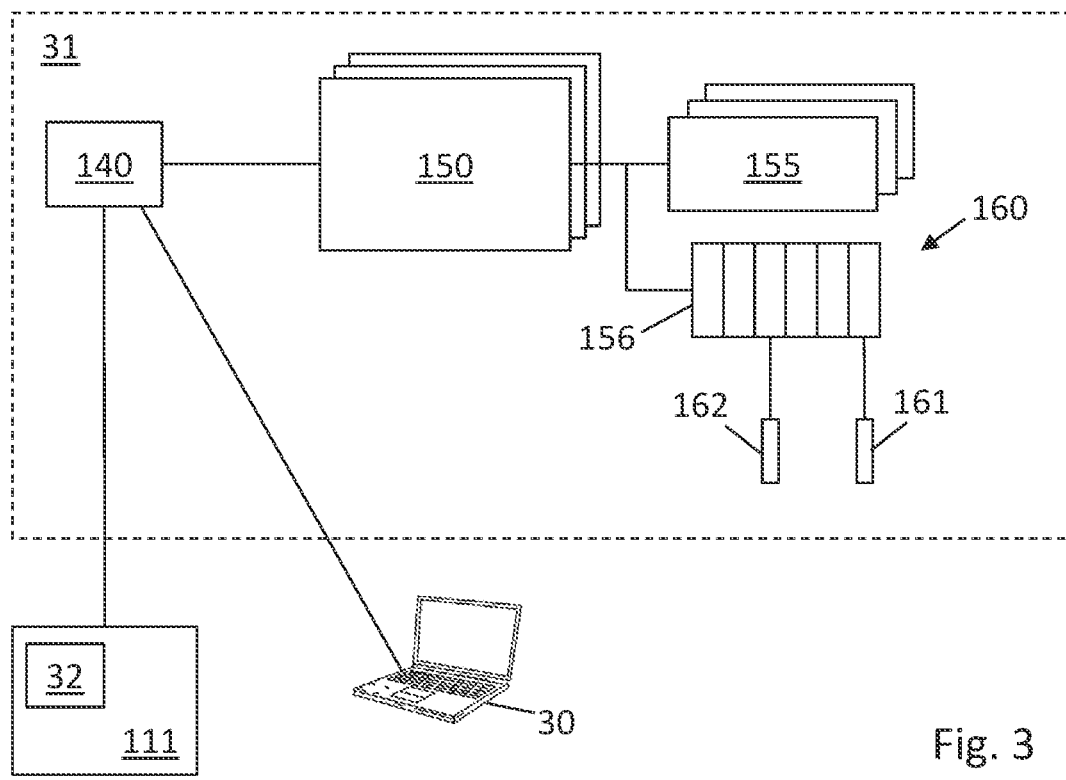
FIG. 3 illustrates an embodiment of a sub-assembly in the form of a function block diagram of an electrical cabinet

FIG. 3 illustrates an embodiment of a sub-assembly in the form of a function block diagram of an electrical cabinet 31 comprising switch 140, distributed controller nodes 150, ethernet-based communication networks 140, controller-area network (CAN) networks 155, 156, where the CAN node 156 shows CAN modules 160 with sensor I/O interfaces and example sensors 161, 162.

FIG. 3 illustrates a realistic connection that needs to be established to a device under test (DUT) 161 in the form of a sensor, such as a temperature sensor, from the test computer 30. The test computer 30 connects to an ethernet switch 140, subsequently to a controller node 150, which via a CAN node 156 connects to I/O interfaces 160 to which the temperature sensor 161 is connected.

Embodiments of the invention is now further described with reference to FIG. 3.

A test engineer with the task of verifying a connection from a computing unit 30, here in the form of a test PC, to a device 161 connected to a fieldbus network in a wind turbine sub-assembly 31. As illustrated in the figure, the fieldbus network comprises a plurality of network components. Some of the network components may be able to store and execute a program element 32 that is capable of establishing a communication path between the possible network components and possible devices. The program element 32 includes a list of possible network components and possible devices, and a library of software elements. In the example, the program element is arranged on the main computer 111, in another example it may be arranged on a control node 150.

In an example, the list of possible network components and devices may be arranged as a list of component identifiers and associated connection software.

The test PC (computing unit) 30 is arranged for forwarding a request to the program element to verify the communication connection from the computing unit to a selected device, the request comprising a sequence of selected network components between the computing unit and the selected device.

In an embodiment, the program element may use a JSON structure which supports a number of commands. For example, a request of the form GetDevice may be used.

A request to test the connection to sensor 161 may be on the form:

GetDevice(Switch[2], ConNode[5,1], CANNode[12], CANModule[6], Sensor[6])

Such request then establish in a sequenced manner the path; Switch number 2 (ref. 140)↔Control Node 5 channel 1 (ref. 150) H CAN Node 12 (ref. 156)↔CAN Module 6 (ref. 160)↔Sensor number 6 (ref. 161).

The request comprises a list defining a sequence of selected network components. This sequence established a requested communication path between the computing unit and the selected device. The requested path in the above example being the path defined by: Switch[2], ConNode[5,1], CANNode[12], CANModule[6], Sensor[6]. In general the requested path can be established from the sequence of the selected network components, such that the requested path is the path established in sequence between each subsequent selected network component. The requested communication path being the resulting communication path of the communication connection between the first selected network component and the second selected network component (the first element of the sequence), followed by the communication connection between the second selected network component and the third selected network component (the second element of the sequence), etc. In this manner the communication connection between each pair of the selected network components in sequence along the requested selected network components is tested. Except for the first selected component and the last selected component, each selected component being both a start node and an end node along the requested communication path.

The request is forwarded to the program element 32 which first confirms that the component type 'Switch' is on the list of possible network components and possible devices. Upon such confirmation, subsequently confirms that the component type 'Control Node' is on the list. Then the library of software elements capable of establishing a communication path between the possible network components and possible devices is accessed for retrieving a software element capable of establishing a communication path between the switch and the control node, this may be obtained by instantiating such software element for the specified communication sub-path. A connection is then made to the control node, and if a connection can be made, the procedure is repeated with the CAN node and the further elements in the request. In this manner the program element is arranged to establish in a sequenced manner a communication connection between the selected network components and the selected device.

If a communication connection can be established to the selected device, a response to the computing unit that the connection exists is forwarded. However, if the communication connection cannot be established, a response is forwarded to the computing unit identifying the selected network component to which the communication connection cannot be established.

In an embodiment the device may be a sensor 162 arranged for determining two or more signals, each signal being identified by a signal identifier, and wherein the request further comprises a selected signal identifier. In an example the sensor may be a wind sensor which is capable of determining both wind speed and wind direction, e.g. with signal identifiers Wspeed and Wdir. In such an example, the request may include a further entry: GetDevice( . . . , Sensor[6], Wspeed).

In an embodiment the device is a sensor further arranged for providing an operational value, and wherein the response comprises the operational value.

In such an example the request may be of the form GetMeasurement, where the response in addition to a confirmation that a connection to each listed device exists a sensor reading of the requested sensor is returned.

Another example is a request of the form: SetAction, which set a given instruction to a device, and where the response in addition to a confirmation that a connection to each listed device exists, a confirmation that the action has been set is returned. An example of this may be a circuit breaker.

In an embodiment, the network component and/or the device is able to identify a fault and wherein the response comprises the fault.

In an example a response may be a statement that no connection to a given device can be made, another statement may be that a connection is available to a given device, but the specified connection port may be wrong.

In an embodiment, the program element may further include a list correlating faults and user-guidance, and wherein the response comprises the user-guidance.

For example, in addition to that a response statement that no connection to a given device can be made, a list of typical causes for such faults may be provided in the response, e.g.:

Please check the cable from the connector X to the control port Y is mounted correctly, Please check if the control node Z is powered on.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method for verifying a connection from a computing unit to a device connected to a fieldbus network in a wind turbine sub-assembly, the method comprising:
    providing the fieldbus network that comprises a plurality of network components, and wherein one of the network components comprises a program element including network components and devices that connect to the fieldbus network, and a library of software elements comprising software elements used to establish a communication path between the network components and devices;
    forwarding, by the computing unit, a request to one or more processors executing the program element to verify the connection from the computing unit to a selected device, the request comprising a sequence of selected network components establishing a requested communication path between the computing unit and the selected device;
    establishing in a sequenced manner, by the one or more processors executing the program element, a communication connection between the selected network components and the selected device by establishing a communication connection between each selected network component and a subsequent selected network component along the requested communication path;
    when the communication connection can be established, forwarding, by the one or more processors executing the program element, a response to the computing unit that the connection exists; and
    when the communication connection cannot be established, forwarding, by the one or more processors executing the program element, a response to the computing unit identifying the selected network component to which the communication connection cannot be established.

2. The method according to claim 1, wherein the network components comprise computing units, ethernet switches and CAN networks.

3. The method according to claim 1, wherein the device is a network component or includes a network component or is a transducer or is a sensor.

4. The method according to claim 1, wherein the device is a sensor; the method further comprising: determining, by the sensor, two or more signals, each signal being identified by a signal identifier, and wherein the request further comprises a selected signal identifier.

5. The method according to claim 1, wherein the device is a sensor; the method further comprising providing, by the sensor, an operational value, and wherein the response comprises the operational value.

6. The method according to claim 1, wherein at least one of the network components and the devices is able to identify a fault and wherein the response comprises the fault.

7. The method according to claim 6, wherein the program element further includes a list correlating faults and user-guidance, and wherein the response comprises the user-guidance.

8. The method according to claim 1, wherein the method is performed prior to placing the wind turbine sub-assembly in a wind turbine.

9. The method according to claim 1, wherein the method is performed on the wind turbine sub-assembly arranged in a wind turbine.

10. The method according to claim 1, wherein the network components and devices are organized in a list as component identifiers and associated connection software.

11. A non-transitory computer readable storage medium comprising software code adapted to verify a connection from a computer to a device connected to a fieldbus network in a wind turbine sub-assembly, the fieldbus network comprises a plurality of network components, and wherein the software code comprises a program element arranged at one of the network components, the program element including network components and devices that connect to the fieldbus network, and a library of software elements comprising software elements used to establish a communication path between the network components and devices, and wherein, when the software code is executed by one or more processors, the one or more processors are adapted to:
    forward a request, which is received from the computer, to the program element to verify the connection from the computer to a selected device, the request comprising a sequence of selected network components establishing a requested communication path between the computer and the selected device;
    establish in a sequenced manner a communication connection between the selected network components and the selected device by establishing a communication connection between each selected network component and a subsequent selected network component along the requested communication path; and
    when the communication connection can be established, forward a response to the computer that the connection exists, and when the communication connection cannot be established, forward a response to the computer identifying the selected network component to which the communication connection cannot be established.

12. The non-transitory computer readable storage medium according to claim 11, wherein the network components and devices are organized in a list as component identifiers and associated connection software.

13. An apparatus to verify a connection, the apparatus comprising:
    a computer arranged to verify the connection to a device selectively connected to a fieldbus network in a wind turbine sub-assembly, the fieldbus network comprising a plurality of network components, and wherein one of the network components comprises a program element including network components and devices that connect to the fieldbus network, and a library of software elements comprising software elements used to establish a communication path between the network components and devices;

wherein the computer is configured for forwarding a request to the program element to verify the connection from the computer to a selected device, the request comprising a sequence of selected network components establishing a requested communication path between the computer and the selected device;

wherein, when the program element is executed by one or more processors of the network component comprising the program element, the one or more processors are configured to:

establish in a sequenced manner a communication connection between the selected network components and the selected device by establishing a communication connection between each selected network component and a subsequent selected network component along the requested communication path;

when the communication connection can be established, forward a response to the computer that the connection exists; and when the communication connection cannot be established, forward a response to the computer identifying the selected network component to which the communication connection cannot be established.

14. The apparatus according to claim 13, wherein the network components and devices are organized in a list as component identifiers and associated connection software.

15. The apparatus according to claim 13, wherein the network components comprise computers, ethernet switches and CAN networks.

16. The apparatus according to claim 13, wherein the device is a network component or includes a network component or is a transducer or is a sensor.

17. The apparatus according to claim 13, wherein the device is a sensor arranged to determine two or more signals, each signal being identified by a signal identifier, and wherein the request further comprises a selected signal identifier.

18. The apparatus according to claim 13, wherein the device is a sensor arranged to provide an operational value, and wherein the response comprises the operational value.

19. The apparatus according to claim 13, wherein at least one of the network components and the devices is able to identify a fault and wherein the response comprises the fault.

20. The apparatus according to claim 19, wherein the program element further includes a list correlating faults and user-guidance, and wherein the response comprises the user-guidance.

* * * * *